United States Patent

[11] 3,628,295

[72] Inventor Philip F. Curtiss
    Myerstown, Pa.
[21] Appl. No. 869,882
[22] Filed Oct. 27, 1969
[45] Patented Dec. 21, 1971
[73] Assignee Paulsboro Chemical Industries, Inc.

[54] MANUFACTURE OF PLASTIC ARTICLES HAVING A MOTTLED SURFACE
    4 Claims, 2 Drawing Figs.

[52] U.S. Cl. .................................................. 54/319,
    72/53, 242/118.32
[51] Int. Cl. ..................................................... B24c 1/06
[50] Field of Search ........................................... 51/319;
    242/118.32; 72/53

[56]         References Cited
        UNITED STATES PATENTS
3,034,743  5/1962  Hill ........................... 242/118.32
3,263,942  8/1966  Elwell ........................ 242/118.32
3,286,406  11/1966 Ashworth ..................... 51/319 X
3,485,074  12/1969 Compton ...................... 51/319 X
3,531,964  10/1970 Manning et al. ............... 51/319 X Primary Examiner—Lester M. Swingle
Attorney—McLean, Morton and Boustead ABSTRACT: This invention relates to the manufacture of plastic articles having a mottled surface, particularly sleeves of textile bobbins used to support yarn packages, by blasting them with glass beads made of silica glass.

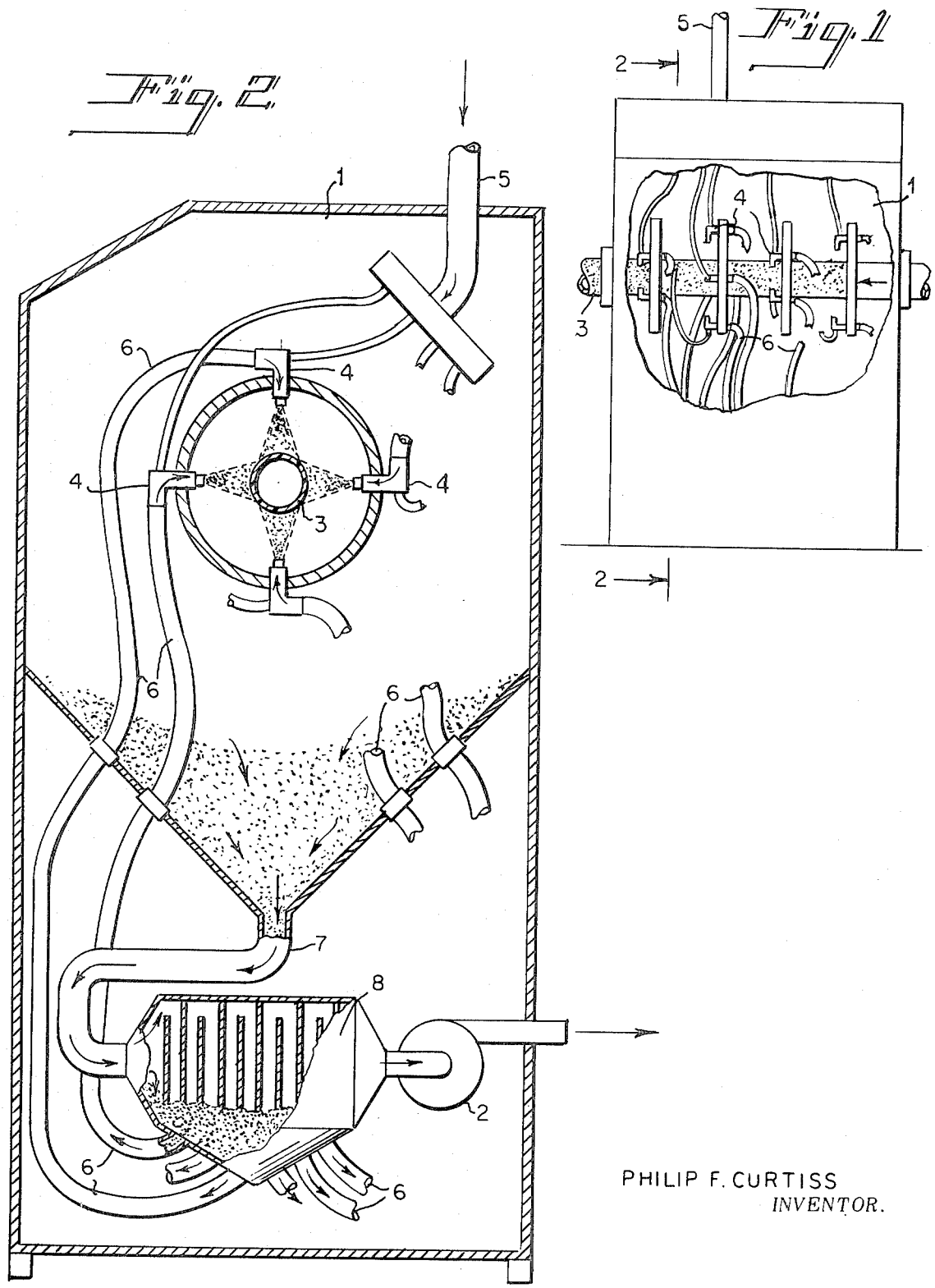
PHILIP F. CURTISS
INVENTOR.

MANUFACTURE OF PLASTIC ARTICLES HAVING A MOTTLED SURFACE

BRIEF SUMMARY OF THE INVENTION

It is known in the art to manufacture plastic articles having an irregular surface. Thus, U.S. Pat. No. 3,034,743 to James Holmes Hill, patented May 15, 1962, describes textile bobbins used to support yarn packages. The bobbins comprise a tubular metal reinforcing barrel and an outer cover or sleeve composed of plastic. In order to reduce sloughing of yarn wound on the sleeve, the surface of the sleeve is made irregular by grooving it in the molding operation or by cutting.

It is also known in the art to manufacture plastic articles, including sleeves for bobbins, by sand blasting them with abrasive particles such as washed, white sand or glass to provide an irregular, nonskid, suedelike surface. See U.S. Pat. No. 3,263,942 to Elwell, patented Aug. 2, 1966.

DETAILED DESCRIPTION

In accordance with the present invention, plastic articles having an irregular surface, particularly a mottled surface, are manufactured by blasting them with glass beads made of silica glass. It will be realized that in a blasting operation, the particulate material used, by it sand or glass, must be used again and again in the interest of economy. If the material used disintegrates or breaks down unduly, difficulties are encountered both with respect to quality control (i.e., consistency of the degree of irregularity of the surface produced on the plastic article), and also with respect to the cleanliness of the surface produced, inasmuch as very finely divided particles of the particulate material used tend to adhere to and thereby contaminate the irregular surface produced on the plastic article. In accordance with the present invention, it has been discovered that beads made of silica glass are advantageously used in the blasting operation, inasmuch as they are especially resistant to disintegration. Thus, when silica glass beads are used, articles of highly uniform quality with respect to degree of irregularity and cleanliness can be produced on a continuous basis.

The plastic article of manufacture produced by blasting in accordance with this invention can be a molded one, but is preferably an extruded one. The plastic is a thermoplastic, yieldable and essentially nonfrangible resilient polymer which has in smooth surfaced form a waxy, slippery texture, and can be a hydrocarbon polymer such as polyethylene or polypropylene; a formaldehyde polyacetal such as Delrin; nylon; a tetrafluoropolyethylene such as Teflon; a chlorotrifluoropolyethylene; polyvinyl chloride; or a softer, resilient copolymer or terpolymer such as acrylonitrile-butadiene-styrene polymer ("ABS").

Also, the plastic article produced by the method of this invention can be any of a wide variety of household or industrial plastic objects such as drinking cups and glasses, plates, and objects having plastic handles such as brushes, hammers and screwdrivers, children's toys, dolls, banisters and railings, stair treads, bathroom mats, and industrial coverings. Preferably, the article is an extruded plastic sleeve for a textile bobbin used to support yarn packages.

As those skilled in the art will understand, the extent to which the plastic is mottled will depend upon the particular plastic blasted, the size of the glass beads used, the air pressure employed in the blasting, and the length of time during which the plastic is blasted. With respect to the foregoing, reference is made to the following example which is to be considered as not limitative of the invention.

The accompanying drawing depicts apparatus and the manner in which the present invention can be carried out.

In the drawing:

FIG. 1 is a schematic view with parts broken away for the sake of clarity, and

FIG. 2 is a cross-sectional view taken along the line 2—2 of FIG. 1.

In the drawing, the numeral 1 represents a chamber which is maintained under a vacuum by means of pump 2. The numeral 3 represents an extruded article being subjected to blasting. The extruded article is blasted with silica glass beads which pass through nozzles 4, air fed from conduit 5 providing then energy required to propel the beads, which are supplied to the nozzles through conduits 6. After impacting the article being blasted, the beads drop and flow by means of conduit 7 into the hopper 8, where they are separated from the air introduced by means of conduit 5. The beads are then recycled to the nozzles 4 through conduits 6. In FIG. 2, there are shown four nozzles arranged circumferentially about the article undergoing the blasting operation. Suitably, three other such arrangements of four nozzles arranged circumferentially about the article undergoing the blasting operation are located longitudinally with respect to the article undergoing blasting, in order to provide greater uniformity of the blasted surface produced.

EXAMPLE

ABS is extruded to provide a tube 1–3 inches in diameter and about 0.020 inches thick. The tube is extruded at the rate of 30 feet per minute.

After the tube has been formed, it is cooled and passed into a chamber which is maintained under a small vacuum, for example, a vacuum of about 2 inches of mercury. In the chamber, the tube is blasted with a mixture of silica glass beads ranging in size from 0.0021 to 0.0165 inches in diameter. The glass beads are passed through sixteen (16) nozzles which have an orifice diameter of five-sixteenths of an inch and which are arranged uniformly around the tube. Air at a pressure of about 30 p.s.i.g. is supplied to each nozzle, and the total amount of air supplied to the sixteen (16) nozzles is about 180 standard cubic feet per minute. The weight of glass beads passed through each nozzle is about 1 pound and 4 ounces per minute.

After having been blasted, the tube is cut into lengths about 13 inches long and is then further formed in order to provide a sleeve for a textile bobbin.

I claim:

1. A method of treating a plastic article made of a plastic which is thermoplastic, yieldable, essentially nonfrangible and resilient and which has a smooth surfaced form a waxy, slippery texture to provide an irregular surface on the plastic article, comprising blasting said plastic article with solid particles which are beads made of silica glass.

2. The method of claim 1 in which said plastic article is one formed by extrusion.

3. The method of claim 2 in which said plastic article is a sleeve for a textile bobbin.

4. The method of claim 3 in which said plastic article is made of acrylonitrile-butadiene-styrene polymer.

* * * * *